US006961579B2

(12) United States Patent
Inukai et al.

(10) Patent No.: US 6,961,579 B2
(45) Date of Patent: Nov. 1, 2005

(54) CONTROL SYSTEM AND METHOD FOR A WIRELESS COMMUNICATIONS TERMINAL

(75) Inventors: Hisamori Inukai, Kadoma (JP); Hidehiko Shin, Moriguchi (JP); Takashi Kawashima, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 361 days.

(21) Appl. No.: 10/325,750

(22) Filed: Dec. 23, 2002

(65) Prior Publication Data

US 2003/0125014 A1 Jul. 3, 2003

(30) Foreign Application Priority Data

Dec. 28, 2001 (JP) ....................................... 2001-400121

(51) Int. Cl.[7] ................................................ H04Q 7/20
(52) U.S. Cl. .................................... 455/456.4; 455/565
(58) Field of Search ............................ 455/456.1–456.6, 455/404.2, 565, 74.1, 68, 521, 422.1; 340/540

(56) References Cited

U.S. PATENT DOCUMENTS

| 5,778,304 | A | | 7/1998 | Grube et al. | |
|---|---|---|---|---|---|
| 6,343,212 | B1 | * | 1/2002 | Weber et al. | ............. 455/404.1 |
| 6,396,399 | B1 | * | 5/2002 | Dunlap | ....................... 340/540 |
| 6,421,544 | B1 | * | 7/2002 | Sawada | ....................... 455/565 |
| 6,456,822 | B1 | * | 9/2002 | Gofman et al. | ................. 455/1 |
| 6,597,895 | B1 | * | 7/2003 | Maeda | .......................... 455/88 |
| 6,625,455 | B1 | * | 9/2003 | Ariga | ....................... 455/456.1 |
| 6,650,894 | B1 | * | 11/2003 | Berstis et al. | ............... 455/420 |
| 6,718,175 | B1 | * | 4/2004 | Edstam | ..................... 455/456.5 |
| 6,792,260 | B1 | * | 9/2004 | Ezuriko | ....................... 455/403 |

FOREIGN PATENT DOCUMENTS

| EP | 0 891 110 | 1/1999 |
|---|---|---|
| JP | 10-243454 | 9/1998 |

* cited by examiner

*Primary Examiner*—Charles N. Appiah
(74) *Attorney, Agent, or Firm*—Wenderoth, Lind & Ponack, L.L.P.

(57) ABSTRACT

A wireless communications terminal stores owner information and function states. A terminal control device transmits, to the wireless communications terminal, control data including control target information for specifying a terminal to be controlled and function state change information indicating a change made in the function states of the terminal. The wireless communications terminal determines, based on the received control target information and the stored owner information, whether or not a function state(s) is to be changed, and changes the stored function states in accordance with the determination result. The wireless communications terminal transmits, to the terminal control device, a process end notification including the terminal's own identification information and indicating whether or not the function state(s) has been changed.

6 Claims, 6 Drawing Sheets

| CONTROL TARGET INFORMATION | NON-TARGET INFORMATION | GROUP NAME | TEACHER |
|---|---|---|---|
| | | USER NAME | ALL |
| | NON-TARGET INFORMATION | GROUP NAME | STAFF |
| | | USER NAME | ALL |
| FUNCTION STATE CHANGE INFORMATION | FUNCTION SPECIFICATION INFORMATION | SPEAKER VOLUME | OFF |
| | | VIBRATION ALERT | ON |
| | | TELEPHONE SIGNAL TRANSMISSION FUNCTION | OFF |
| | | E-MAIL TRANSMISSION FUNCTION | OFF |
| | TIME SPECIFICATION INFORMATION | START TIME | 19:00 |
| | | END TIME | 20:30 |

| CONTROL TARGET INFORMATION | TARGET INFORMATION | GROUP NAME | HEADPHONE |
|---|---|---|---|
| | | USER NAME | Taro |
| FUNCTION STATE CHANGE INFORMATION | FUNCTION SPECIFICATION INFORMATION | SPEAKER VOLUME | MAX |

| CONTROL TARGET INFORMATION | TARGET INFORMATION | GROUP NAME | PDA-light |
|---|---|---|---|
| | | USER NAME | ALL |
| FUNCTION STATE CHANGE INFORMATION | FUNCTION SPECIFICATION INFORMATION | TELEPHONE FUNCTION | ON |
| | TIME SPECIFICATION INFORMATION | DURATION | 600 |

CONTROL SYSTEM AND METHOD FOR A WIRELESS COMMUNICATIONS TERMINAL

BACKGROUND OF THE INVENTION

1. Field of the Invention

The present invention relates to a control system for a wireless communications terminal used in a wireless communications system, and more specifically, to a control system for a wireless communications terminal in which the control system controlling function states of the wireless communication terminal by using a terminal control device.

2. Description of the Background Art

The use of a wireless communications terminal such as a mobile phone and a PHS (Personal Handy phone System) terminal has spread so rapidly that it is now possible to have a conversation over a telephone or communicate with each other by using such a wireless communications terminal at any time and any place. However, such a desirable advantage of the wireless communications terminal capable of communicating at any time and any place can be undesirable under some circumstances. For example, it is often undesirable for a school lesson to be disturbed by a student's mobile phone ringing in the classroom.

To avoid such situations, the wireless communications terminal, which supports various functions, is structured so as to store, for example, information about whether each function is permitted or not, and/or parameters to be used when executing each function, such that the values of the parameters can be changed from outside of the terminal. Such information stored in the wireless communications terminal is hereinafter referred to as a "function state". For example, the function state includes information whether calls can be made or received, or information about a type and a sound volume of a ring tone for a received call or mail message, and the like. The wireless communications terminal is typically structured so as to enable the function state to be changed by using input keys or the like, thereby allowing a user of the terminal to change the terminal's function state based on the circumstances where the terminal is used. Thus, the functions of the wireless communications terminal can be restricted within a certain range based on a setting which is inputted by the user.

Japanese Patent Laid-Open Publication No. H10-243454 discloses a system for controlling a function state of a wireless communications terminal based on a method other than using a setting which is inputted by a user. In the system disclosed in this gazette, a terminal control device is placed in an area where a function state of a wireless communications terminal is to be changed. The terminal control device transmits a control signal for changing the function state of the terminal, thereby enabling the terminal to change its function state based on the control signal transmitted from the terminal control device.

However, the above-described system has a problem in that the function states of all wireless communications terminals that have received the control signal will be uniformly changed into the same state, thereby restricting the functions of even those wireless communications terminals whose function states are not to be changed. Furthermore, the terminal control device cannot check whether a wireless communications terminal has actually changed its function state, which makes it impossible for the device to manage the function state of the terminal based on the current function state thereof.

SUMMARY OF THE INVENTION

Therefore, an object of the present invention is to provide a control system for a wireless communications terminal which can change a function state of a specific wireless communications terminal and allows a terminal control device to check that the wireless communications terminal has actually changed its function state.

The present invention has the following features to attain the object mentioned above.

A first aspect of the present invention is directed to a control system for at least one wireless communications terminal for controlling a function of the at least one wireless communications terminal. The control system includes a terminal control device, and the at least one wireless communications terminal. The terminal control device includes: a control data generation section for generating control data including control target information to specify a terminal of the at least one wireless communications terminal to be controlled, and function state change information about a change made in a function state of the terminal; and a transmitting section for transmitting the control data generated by the control data generation section to the at least one wireless communications terminal. Each of the at least one wireless communications terminal includes: a function state storing section for storing the function state of the wireless communications terminal; a receiving section for receiving the control data transmitted from the terminal control device; an extraction section for extracting the control target information and the function state change information from the control data received by the receiving section; a determination section for determining, based on the control target information extracted by the extraction section, whether the function state stored in the function state storing section is to be changed; and a change section for changing, in accordance with a determination result obtained by the determination section, the function state stored in the function state storing section, based on the function state change information extracted by the extraction section.

As described above, in the first aspect, the wireless communications terminal stores its own function state, and the terminal control device transmits, to the wireless communications terminal, the control data including the control target information and the function state change information. The wireless communications terminal determines, based on the received control target information, whether the function state is to be changed, and changes the stored function state in accordance with the determination result. Thus, it is possible to change a function state of a specific wireless communications terminal.

In a second aspect of the present invention based on the first aspect, each of the at least one wireless communications terminal further includes an owner information storing section for storing owner information of the wireless communications terminal. Further, the determination section determines, based on the control target information extracted by the extraction section and the owner information stored in the owner information storing section, whether the function state stored in the function state storing section is to be changed.

As described above, in the second aspect, the wireless communications terminal stores its own owner information, and determines whether the function state is to be changed or not based on the received control target information and owner information. Thus, it is possible to easily specify a wireless communications terminal whose function state is to be changed.

In a third aspect of the present invention based on the second aspect, each of the at least one wireless communications terminal further includes a response transmitting section for transmitting, to the terminal control device, a response which indicates whether the function state stored in the function state storing section has been changed, where the response includes identification information of the wireless communications terminal. In addition, the terminal control device further includes: a response receiving section for receiving the response transmitted from the at least one wireless communications terminal; a process history storing section for storing the response received by the response receiving section as a process history; and a management section for changing, based on the process history stored in the process history storing section, a content of the control data to be generated by the control data generation section.

As described above, in the third aspect, the wireless communications terminal transmits the response which indicates whether the function state has been changed, where the response including its own identification information. Thus, the terminal control device can check that the wireless communications terminal has changed its function state, thereby enabling the function state to be changed effectively.

In a fourth aspect of the present invention based on the second aspect, the function state change information includes function specification information including a value to be set in the terminal to be controlled and time specification information specifying a period of time during which the value included in the function specification information of the terminal is effective. The change section changes, only within the period of time specified by the time specification information, the function state stored in the function state storing section into the value included in the function specification information.

As described above, in the fourth aspect, the wireless communications terminal receives the time specification information, and changes the stored function state only within the specified time. Thus, it is possible to temporarily change the function of the wireless communications terminal by using the terminal control device.

A fifth aspect of the present invention is directed to a terminal control device controlling a function of at least one wireless communications terminal. The terminal control device includes a control data generation section for generating control data including control target information to specify a terminal of the at least one wireless communications terminal to be controlled and function state change information indicating a change made in a function state of the terminal, and a transmitting section for transmitting, to the wireless communications terminal, the control data generated by the control data generation section.

As described above, in the fifth aspect, it is possible to provide the terminal control device in the control system for a wireless communications terminal according to the first aspect.

A sixth aspect of the present invention is directed to a wireless communications terminal structured so that a function thereof is controllable by a terminal control device. The wireless communications terminal includes: a function state storing section for storing the terminal's own function state; a receiving section for receiving, from the terminal control device, control data including control target information to specify a terminal to be controlled and function state change information indicating a change made in the function state; an extraction section for extracting the control target information and the function state change information from the control data received by the receiving section; a determination section for determining, based on the control target information extracted by the extraction section, whether or not function state stored in the function state storing section is to be changed; and a change section for changing, in accordance with the determination result obtained by the determination section, the function state stored in the function state storing section based on the function state change information extracted by the extraction section.

As described above, in the sixth aspect, it is possible to provide the wireless communications terminal in the control system for a wireless communications terminal according to the first aspect.

A seventh aspect of the present invention is directed to a control method for at least one wireless communications terminal controlling a function of the at least one wireless communications terminal by using a terminal control device, the method being executed with a function state of each of the at least one wireless communications terminal being stored in the wireless communications terminal. In the terminal device, the method includes: a generation step of generating control data including control target information to specify a terminal of the at least one wireless communications terminal to be controlled and function state change information indicating a change made in the function state of the terminal; and a transmitting step of transmitting the generated control data to the wireless communications terminal. In each of the at least one wireless communications terminal, the method includes: a receiving step of receiving the transmitted control data; an extraction step of extracting the control target information and the function state change information from the received control data; a determination step of determining whether or not the stored function state is to be changed based on the extracted control target information; and a change step of changing the stored function state based on the extracted function state change information in accordance with the determination result.

As described above, in the seventh aspect, the wireless communications terminal stores its own function state, and the terminal control device transmits, to the wireless communications terminal, the control data including control target information and function state change information. The wireless communications terminal determines, based on the received control target information, whether or not the function state is to be changed, and changes the stored function state in accordance with the determination result. Thus, it is possible to change a function state of a specific wireless communications terminal.

An eighth aspect of the present invention is directed to a program which is executed by a wireless communications terminal for enabling control of a function by using a terminal control device. The program being executed with a function state of each of the at least one wireless communications terminal being stored in the wireless communications terminal. The program includes: a receiving step of receiving control data including control target information to specify a terminal to be controlled and function state change information indicating a change made in the function state of the terminal; an extraction step of extracting the control target information and the function state change information from the received control data; a determination step of determining, based on the extracted control target information, whether or not the stored function state is to be changed or not; and a change step of changing, in accordance with the determination result, the stored function state based on the extracted function state change information.

As described above, in the eighth aspect, it is possible to provide the program executed, by the wireless communications terminal in the control system for a wireless communications terminal according to the first aspect, for enabling a function control by using the terminal control device.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 6A to 6C are illustrations showing exemplary structures of control data transmitted from the terminal control device to the wireless communications terminal of the control system for a wireless communications terminal according to the embodiment of the present invention.

DESCRIPTION OF THE PREFERRED EMBODIMENTS

Figure 1:
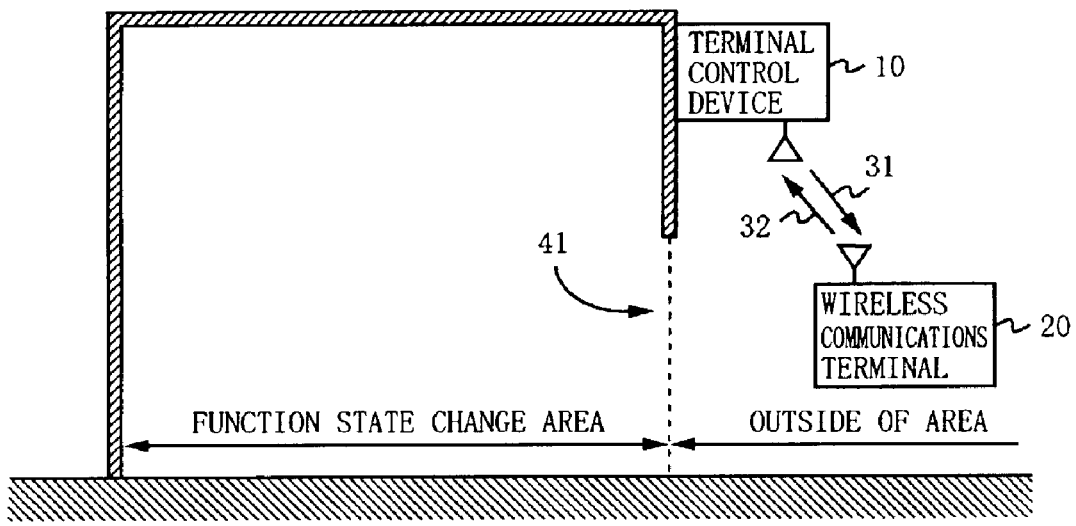
FIG. 1 is an illustration showing the structure of a control system for a wireless communications terminal according to an embodiment of the present invention.

FIG. 1 is an illustration showing the structure of a control system for a wireless communications terminal according to an embodiment of the present invention. The system shown in FIG. 1, including a terminal control device 10 and a wireless communications terminal 20, and the system is characterized by an ability to change function states of the wireless communications terminal 20 found in a function state change area. The vertical direction in FIG. 1 corresponds to the direction perpendicular to the ground. Hereinafter, the term "function state" is used in reference to each of a number of functions which are supported by the wireless communications terminal.

As shown in FIG. 1, the terminal control device 10 and the wireless communications terminal 20 are connected communicably with each other by radio waves. More specifically, the terminal control device 10 and the wireless communications terminal 20 are connected communicably with each other, for example, by using a wireless network such as a wireless local area network (LAN), Bluetooth, infrared communications, a mobile phone, and a PHS terminal. The terminal control device 10 is placed around a doorway 41 of an area where the function states of the wireless communications terminal 20 are to be changed (hereinafter referred to as "function state change area"). In FIG. 1, the terminal control device 10 is placed on a wall around a doorway 41 of the function state change area. The function state change area is, for example, a hospital, a compartment on a train, a concert hall, a meeting room, and a classroom. The terminal control device 10 transmits control data 31 at regular intervals, continuously, or over a specific period of time to the wireless communications terminal 20, which may be taken in or out the function state change area.

The control data 31 is used to change the function states of the wireless communications terminal 20. The control data 31 includes control target information and function state change information. The control target information is information for specifying a wireless communications terminal to be (or not to be) controlled. Specifically, the control target information is, for example, information including one or any combination of user's name, users' group name, user's job title, telephone number, mail address, serial number, part number, and generic or proper name of a device, and the like.

The function state change information is information about a change made in the function states of the wireless communications terminal to be controlled. The function state change information includes function specification information and, if necessary, time specification information. The function specification information includes a value to be set in the wireless communications terminal as the function states. Specifically, the function specification information includes, for example, a value (ON/OFF value or parameter) to be set in the wireless communications terminal about the following information: power ON, power OFF, phone ring tone OFF, amplifying or lowering the volume of a phone ring tone, phone ring tone ON, amplifying or lowering the volume of a notification sound of an incoming mail, vibration alert ON, vibration alert OFF, wireless signal transmission OFF, wireless signal transmission ON, call reception OFF, call reception ON, data reception OFF, data reception ON, data transmission OFF, and data transmission ON, etc. The time specification information is information for specifying a period of time during which the function states are to be changed. Specifically, the time specification information is, for example, one or any arbitrary combination of information about a start time, an end time, and duration. The function state change information at least includes function specification information, and may not need to include time specification information.

The control data 31 transmitted from the terminal control device 10 is determined in various ways. For example, the terminal control device 10 may include input means such as input keys or input switches, thereby allowing an administrator of the terminal control device 10 to determine the control data 31. Alternatively, the terminal control device 10 may be connected communicably with a management device of a wireless communications system, etc., for receiving the control data 31 therefrom. Alternatively, the terminal control device 10 may receive a process end notification 32 about whether the function states of the wireless communications terminal 20 have been changed or not, thereby changing a content of the control data 31 based on the received process end notification 32.

The wireless communications terminal 20 is, for example, a mobile phone, a PHS terminal, a PDA (Personal Digital Assistant), a personal computer, an audio-video device, etc. Furthermore, the wireless communications terminal 20 may be a headphone or an earphone, etc., communicably connected to each device described above and capable of wireless communications. The wireless communication terminal 20 receives, from the terminal control device 10, the control data 31 at a point near the doorway 41 of the function state change area, thereby changing its function states based on the received control data 31 and transmitting the process end notification 32 to the terminal control device 10.

Figure 2A:
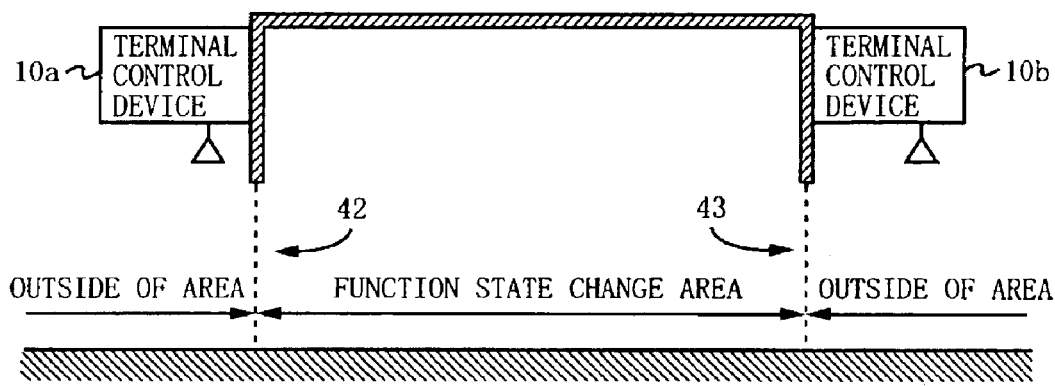
FIGS. 2A to 2C are illustrations showing other exemplary installations of a terminal control device of the control system for a wireless communications terminal according to the embodiment of the present invention.
Figure 2B:
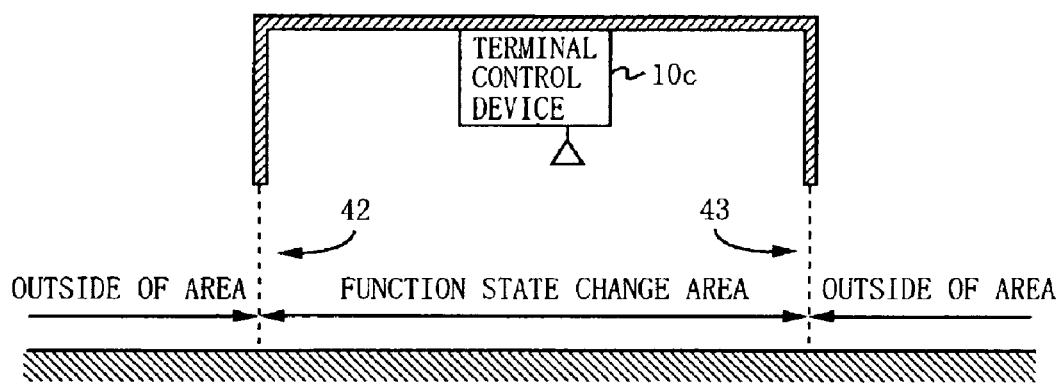
Figure 2C:
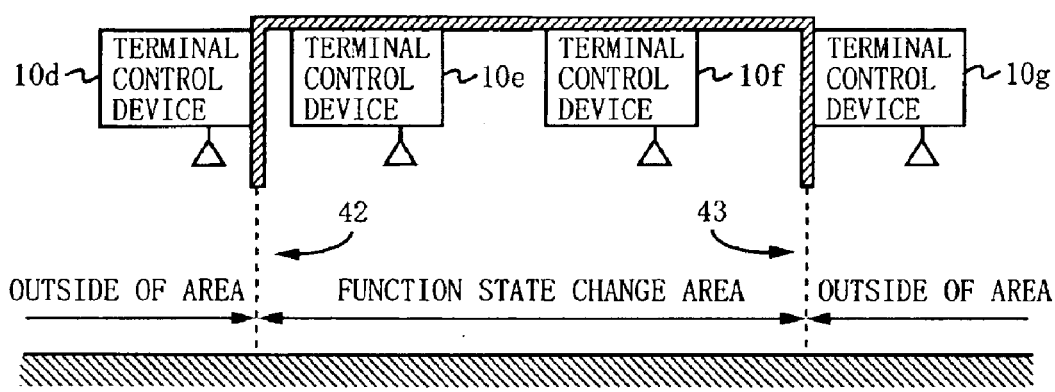

In FIG. 1, one terminal control device 10 is assumed to be placed on the wall around the doorway 41 of the function state change area, however, the number and the location of the terminal control device 10 are not restricted thereto. FIGS. 2A to 2C are illustrations showing other exemplary installations of the terminal control device 10. In FIGS. 2A to 2C, the vertical direction corresponds to the direction perpendicular to the ground as in FIG. 1. In an exemplary installation shown in FIG. 2A, a terminal control device 10a and a terminal control device 10b are placed on a wall around an entrance 42 and an exit 43 of the function state change area, respectively. In an exemplary installation shown in FIG. 2B, a terminal control device 10c is placed on a ceiling of the function state change area. Furthermore, in an exemplary installation shown in FIG. 2C, a terminal control device 10d and a terminal control device 10g are placed on a wall around an entrance 42 and an exit 43 of the function state change area, respectively, and terminal control devices 10e and 10f are each placed on a ceiling of the function state change area. In the exemplary installations shown in FIGS. 2A to 2C, the terminal control devices 10a to 10g are placed on the wall or the ceiling. However, the terminal control device 10 may be placed on a floor, or may be deployed in a movable manner.

Furthermore, the terminal control device 10 may transmit a piece of control data 31 with both control target information and function state change information being included therein, or the terminal control device 10 may transmit these two pieces of information separately. Still further, a base station controlling transmission of the wireless communications terminal 20 may be used as the terminal control device 10, whereby the control data 31 is transmitted by using a wireless communications function which is originally provided with the wireless communications terminal 20. Alternatively, the terminal control device 10 maybe installed separately from the base station, whereby the control data 31 is transmitted by using a wireless communications function other than that which is originally provided with the wireless communications terminal 20. As an example of the latter case, in a control system for a wireless communications terminal, the control data 31 may be transmitted by using Bluetooth in the case where the wireless communications terminal 20 is a mobile phone.

Figure 3:
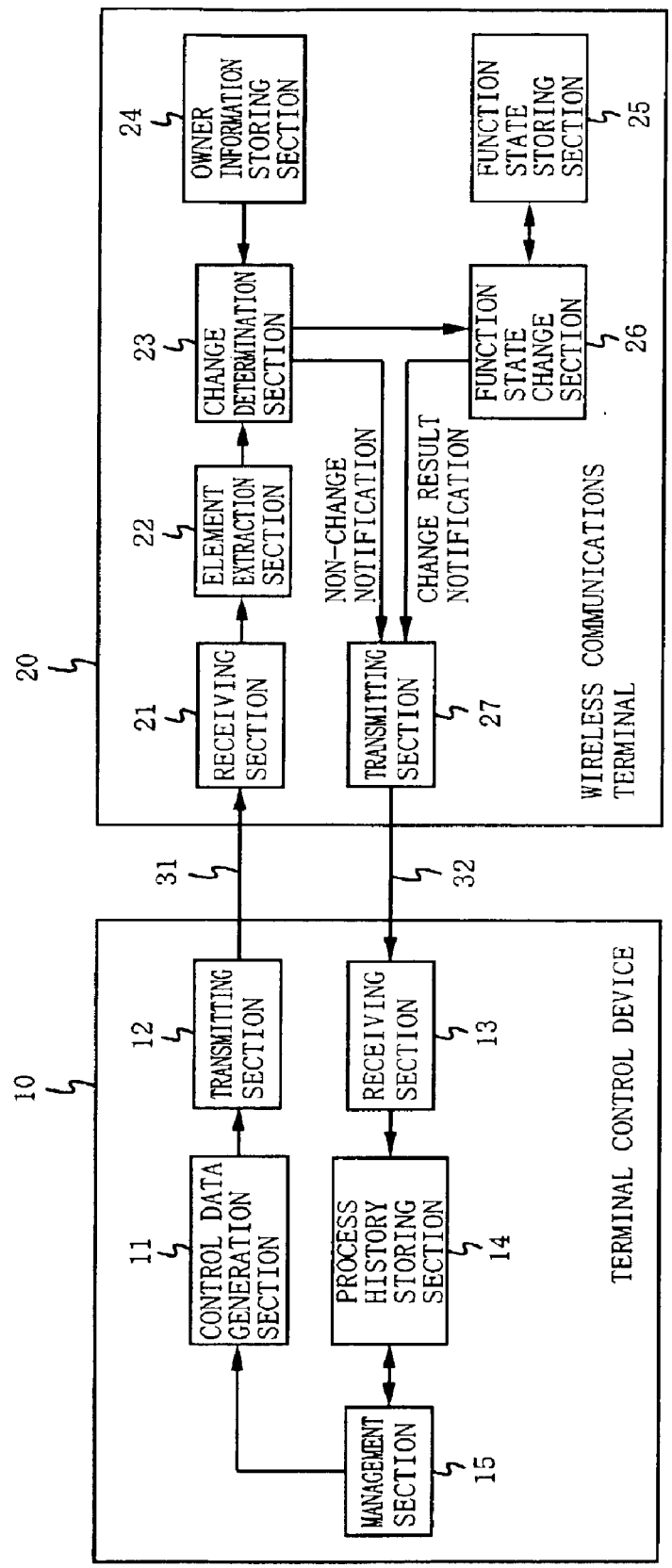
FIG. 3 is a block diagram showing a detailed structure of the terminal control device and the wireless communications terminal of the control system for a wireless communications terminal according to the embodiment of the present invention.

FIG. 3 is a block diagram showing a detailed structure of the terminal control device 10 and the wireless communications terminal 20. As shown in FIG. 3, the terminal control device 10 includes a control data generation section 11, a transmitting section 12, a receiving section 13, a process history storing section 14, and a management section 15. The wireless communications terminal 20 includes a receiving section 21, an element extraction section 22, a change determination section 23, an owner information storing section 24, a function state storing section 25, a function state change section 26, and a transmitting section 27.

Each component shown in FIG. 3 generally operates as follows. The control data generation section 11 generates control data for controlling the function states of the wireless communications terminal 20, and outputs the control data to the transmitting section 12. The transmitting section 12 transmits the control data outputted from the control data generation section 11 to the wireless communications terminal 20 by radio waves. As such, the control data 31 is transmitted by radio waves from the terminal control device 10 to the wireless communications terminal 20.

In the wireless communications terminal 20, the owner information storing section 24 stores owner information of the wireless communications terminal 20, and the function state storing section 25 stores the function states of the wireless communications terminal 20. The receiving section 21 receives the control data 31 transmitted from the terminal control device 10, and outputs the received control data 31 to the element extraction section 22. The element extraction section 22 extracts control target information and function state change information from the control data outputted from the receiving section 21, and outputs the extracted information to the change determination section 23. The change determination section 23 determines whether any function state stored in the function state storing section 25 is to be changed based on both the control target information outputted from the element extraction section 22 and the owner information stored in the owner information storing section 24.

When it is determined that no function states are to be changed, the change determination section 23 notifies the transmitting section 27 that no function states are to be changed. In this case, the transmitting section 27 transmits the process end notification 32 which indicates that no function states have been changed, the notification including an identifier of the wireless communications terminal 20.

On the other hand, when it is determined that any function state is to be changed, the change determination section 23 outputs the function state change information outputted from the element extraction section 22 to the function state change section 26. In this case, the function state change section 26 selects a function state(s) to be changed, based on the function state change information outputted from the change determination section 23 and the current function states stored in the function state storing section 25, thereby changing the function state(s) selected from among the function states stored in the function state storing section 25, based on the function state change information outputted from the change determination section 23. Then, the function state change section 26 notifies the transmitting section 27 of the change result of the function state(s). The transmitting section 27 transmits, by radio waves, the process end notification 32 which indicates the change result of the function state(s), where the notification including the identifier of the wireless communications terminal 20, based on the notification from the function state change section 26. As such, regardless of whether or not any function state of the wireless communications terminal 20 has been changed, the process end notification 32 is transmitted by radio waves from the wireless communications terminal 20 to the terminal control device 10.

In the terminal control device 10, the process history storing section 14 stores as a process history the change result of the function state(s) transmitted from the wireless communications terminal 20. The receiving section 13 receives the process end notification 32 transmitted from the wireless communications terminal 20, and updates the process history stored in the process history storing section 14 based on the received process end notification 32. The management section 15 manages an operation of the control data generation section 11 based on the process history stored in the process history storing section 14. For example, when the process end notification 32 is received from all of the wireless communications terminals 20 whose function state(s) is to be changed, the management section 15 may control the control data generation section 11 to stop transmission of the control data 31. Alternatively, when the control data generation section 11 generates the control data 31 that is transmitted to the wireless communications terminal 20 which is taken out of the function state change area, the management section 15 may control the control data generation section 11 so as to control only the wireless communications terminal 20 that has transmitted the process end notification 32 indicating that its function state(s) has been changed (that is, the wireless communications terminal 20 whose function state(s) has been changed). Alternatively, the management section 15 may identify the wireless communications terminal 20 which is taken in or out the function state change area based on the process history stored in the process history storing section 14, for example, so as to check whether or not each student is present in the case where the function state change area is a classroom.

The wireless communications terminal 20 waits for the control data 31 as well as a wireless signal to come when the wireless communications terminal 20 is operating. When the wireless signal is received, the wireless communications terminal 20 executes a wireless communications function originally provided therewith. The wireless communications terminal 20 may have any type of wireless communications function, and the type of the wireless communication function does not affect the structure of the present invention. Therefore, the description thereof is hereinafter omitted.

Figure 4:
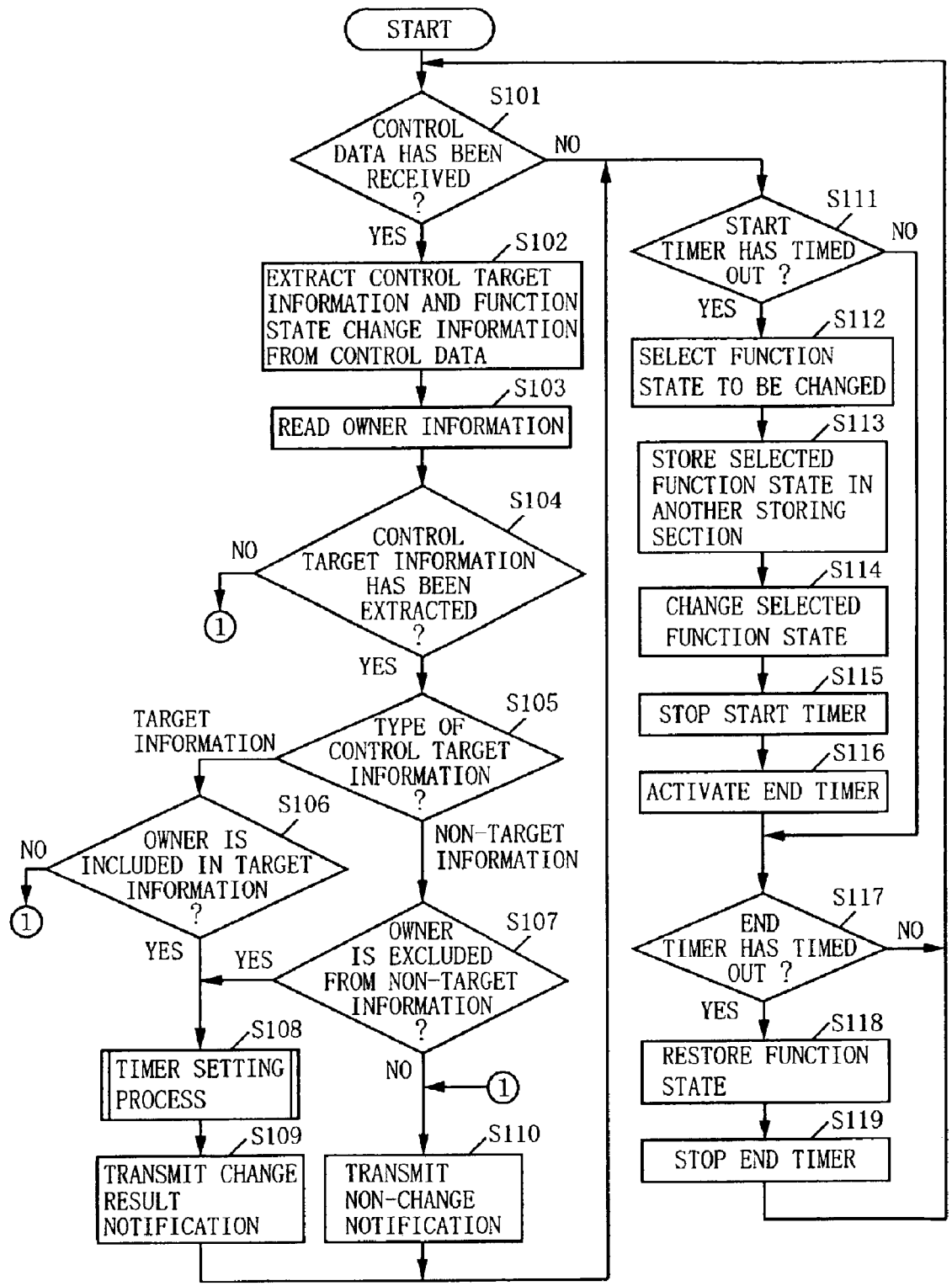
FIG. 4 is a flowchart illustrating a function state change process performed by the wireless communications terminal of the control system for a wireless communications terminal according to the embodiment of the present invention.

When the control data 31 is received, the wireless communications terminal 20 operates in accordance with a flowchart shown in FIG. 4. FIG. 4 is the flowchart illustrating a function state change process which is performed by the wireless communications terminal 20. In the process illustrated in FIG. 4, two timers are used: a start timer for measuring a lapse (period) of time after receiving the control data 31 before beginning to change a function state(s), and an end timer for measuring a lapse of time after changing the function state(s) before restoring it to the original state. The details of the flowchart illustrated in FIG. 4 are described below.

As illustrated in FIG. 4, the wireless communications terminal 20 repeatedly performs the following three processes: a process performed when the control data has been received (steps S102 to S110, a process performed when the start timer has timed out (steps S112 to S116), and a process which is performed when the end timer has timed out (steps S118 to S119). More specifically, the wireless communications terminal 20 determines whether or not the control data has been received or not (step S101). When it is determined that the control data has been received, the wireless communications terminal 20 performs the process carried out in steps S102 to S110. Then, the wireless communications terminal 20 determines whether or not the start timer has timed out (step S111). When it is determined that the start timer has timed out, the wireless communications terminal 20 performs the process carried out in steps S112 to S116. Then, the wireless communications terminal 20 determines whether or not the end timer has timed out or not (step S117). When it is determined that the end timer has timed out, the wireless communications terminal 20 performs the process carried out in steps S118 to S119. Then, the wireless communications terminal 20 returns to step S101, and repeats the above-described three processes.

The process which is performed when the control data has been received (steps S102 to S110) is described as a first process. In the wireless communications terminal 20, the receiving section 21 receives the control data 31 transmitted from the terminal control device 10 and outputs the received control data to the element extraction section 22. The element extraction section 22 extracts both the control target information and the function state change information from the control data outputted from the receiving section 21, and outputs the extracted information to the change determination section 23 (step S102). The change determination section 23 reads the owner information of the wireless communications terminal 20 from the owner information storing section 24 (step S103). Then, the change determination section 23 determines whether the control target information has been extracted in step S102 or not (step S104). When it is determined that the control target information has been extracted in step S102, the change determination section 23 proceeds to step S105. Otherwise, the change determination section 23 proceeds to step S110.

When proceeding to step S105, the change determination section 23 checks the type of the control target information extracted in the element extraction section 22 (step S105), that is, checks which one of the information, target information or non-target information, has been included in the control target information. The target information is information for specifying a wireless communications terminal whose function state(s) is to be changed, and the non-target information is information for specifying a wireless communications terminal whose function state(s) is not to be changed. The change determination section 23 proceeds to step S106 when the control target information is target information, or proceeds to step S107 when the control target information is non-target information.

When the control target information is target information, the change determination section 23 determines whether an owner of the wireless communications terminal 20 is included in the target information based on the target information and the owner information read in step S103 (step S106). When the control target information is non-target information, the change determination section 23 determines whether or not the owner is excluded from the non-target information based on the non-target information and the owner information read in step S103 (step S107).

When it is determined that the owner is included in the target information in step S106, or that the owner is excluded from the non-target information in step S107, the change determination section 23 proceeds to step S108. In this case, the function state change section 26 performs a timer setting process (shown in FIG. 5) (step S108). In the timer setting process, values of the start timer and the end timer are set if required. Then, the function state change section 26 notifies the transmitting section 27 of the change result of the function state(s). The transmitting section 27 transmits the process end notification 32 which indicates the change result of the function state(s) to the terminal control device 10, the notification including the identifier of the wireless communications terminal 20, based on the notification from the function state change section 26 (step S109).

On the other hand, when it is determined that the owner is not included in the target information in step S106, or that the owner is not excluded from the non-target information in step S107, the change determination section 23 proceeds to step S110. In this case, the change determination section 23 notifies the transmitting section 27 that the function state(s) is not to be changed. The transmitting section 27 transmits the process end notification 32 which indicates that the function state(s) has not been changed, the notification including the identifier of the wireless communications terminal 20(step S110).

The process which is performed when the start timer has timed out (steps S112 to S116) will now be described as a second process. When the start timer has timed out, the function state change section 26 starts operating. The function state change section 26 selects a function state(s) to be changed based on the function specification information extracted in step S201 described further below and the current function states stored in the function state storing section 25 (step S112). More specifically, the function state change section 26 supposes that, in principle, all the function states included in the function specification information are to be changed, any then excludes, from the function states to be changed, any function state whose two values (i.e., one included in the function specification information and another stored in the function state storing section 25) coincide with each other.

Then, the function state change section 26 reads the value of the selected function state(s) from the function state storing section 25, which is currently stored therein, for saving the read value in another storing section (not shown) (step S113). By saving the current function states as described above, the function states can be restored to the original state when the end timer has timed out. Then, the function state change section 26 changes the value of the selected function state(s), which is currently stored in the function state storing section 25, into the value included in the function specification information (step S114). Then, the function state change section 26 stops the start timer (step S115), and activates the end timer (step S116). The end timer is timed out when a time corresponding to the set value of the timer has lapsed.

The process which is performed when the end timer has timed out (steps S118 to S119) will now be described as a third process. When the end timer has timed out, the function state change section 26 starts operating. The function state change section 26 restores the function states stored in the function state storing section 25 to the original state (step S118). More specifically, the function state change section reads the value stored in another storing section 26 in step S113, and changes the value of the function states stored in the function state storing section 25 into the read value. Then, the function state change section 26 stops the end timer (step S119).

Figure 5:
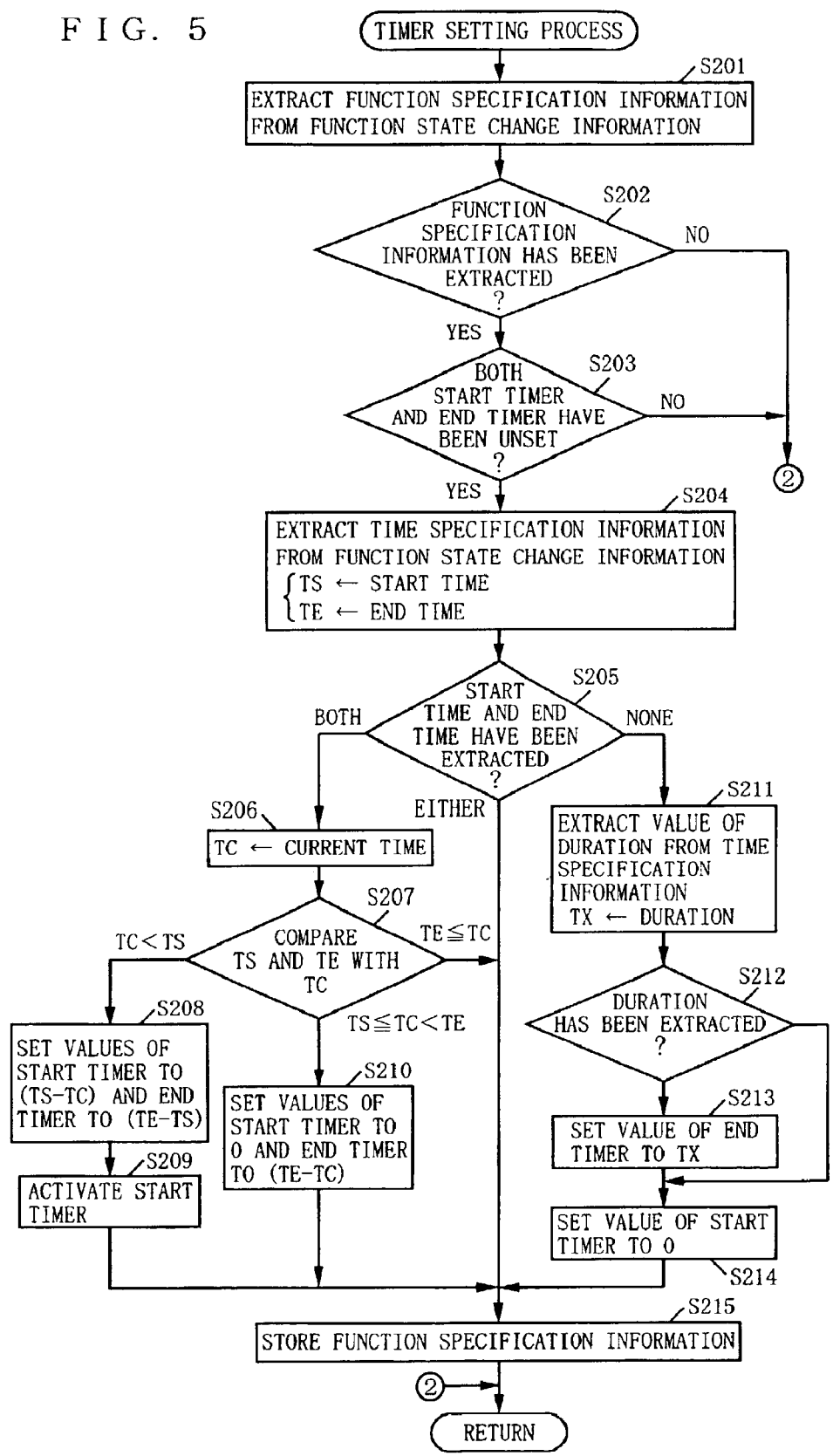
FIG. 5 is a flowchart illustrating a timer setting process performed by the wireless communications terminal of the control system for a wireless communications terminal according to the embodiment of the present invention.

FIG. 5 is a flowchart illustrating the details of the timer setting process (step S108). The function change section 26 operates in the timer setting process. The function change section 26 extracts function specification information from the function state change information outputted from the change determination section 23 (step S201). Then, the function state change section 26 determines whether the function specification information has been extracted in step S201 or not (step S202). When it is determined that the function specification information has been extracted in step S201, the function state change section 26 proceeds to step S203. In this case, the function state change section 26 determines whether both the start timer and the end timer have been unset or not (step S203). When it is determined that both the start timer and the end timer have been unset, the function state change section 26 proceeds to step S204. When it is determined in step S202 that the function specification information has not been extracted in step S201, or determined in step S203 that neither the start timer nor the end timer have been unset, the function state change section 26 ends the timer setting process without completing the following processing. Thus, even if the wireless communications terminal 20 repeatedly receives the control data, it is possible to prevent the two timers from having values repeatedly set therein.

Then, the function state change section 26 extracts, from the function state change information outputted from the change determination section 23, a start time and an end time included in the time specification information (step S204). The start time and the end time extracted in step S204 are hereinafter represented as TS and TE, respectively. Then, the function state change section 26 determines whether the start time and the end time have been extracted in step S204 (step S205). When it is determined that both the start time and the end time have been extracted in step S205, the function state change section 26 proceeds to step S206. When it is determined that either the start time or the end time has been extracted, the function state change section 26 proceeds to step S215. When neither the start time nor the end time has been extracted, the function state change section 26 proceeds to step S211.

When it is determined that both the start and end times have been extracted in step S206, the function state change section 26 obtains a current time (step S206). The obtained current time is hereinafter represented as TC. Then, the function state change section 26 compares the start time TS and the end time TE with the current time TC (step S207). When carrying out such a comparison, the function state change section 26 may compare hours and minutes of TS, TE, and TC, or may compare hours, minutes, and seconds thereof. When TC is smaller than TS (i.e., the current time is earlier than the start time), the function state change section 26 proceeds to step S208. In this case, the function state change section 26 sets the start timer to (TS-TC) and the end timer to (TE-TS) (step S208). Then, the function state change section 26 activates the start timer (step S209), and proceeds to step S215. The start timer is timed out when time corresponding to the set value of the timer has lapsed. When it is determined in step S207 that TC is equal to or greater than TS and is smaller than TE (i.e., the current time is the same as or later than the start time, and is earlier than the end time), the function state change section 26 sets the start timer to 0 (indicating that the start timer will be timed out immediately) and the end timer to (TE-TC) (step S210), and proceeds to step S215. When TC is equal to or greater than TE (i.e., the current time is later than the end time), the function state change section 26 proceeds to step S215 without setting values in the two timers.

When it is determined in step S206 that neither the start time nor the end time has been extracted, the function state change section 26 extracts the duration, if any, from the time specification information (step S211). The duration extracted in step S211 is hereinafter represented as TX. Then, the function state change section 26 determines whether or not the duration has been extracted in step S211 (step S212). When it is determined that the duration has been extracted in step S211, the function state change section 26 sets the end timer to TX (step S213). Then, the function state change section 26 sets the start timer to 0 (step S214), and proceeds to step S215.

In step S215, the function state change section 26 stores the function specification information extracted in step S201. The function specification information stored in step S215 is used in the process (steps S112 to S116) which is performed when the start timer has timed out.

In the process shown in FIG. 5, when it is determined in step S205 that either the start time or the end time has been extracted, it is assumed that the function state change section 26 determines that the format of the time specification information is not correct, and does not set values in the two timers. In this case, however, the function state change section 26 may set values to the two timers based on the extracted time.

Alternatively, the function state change process may be performed in the wireless communications terminal 20 by preparing a program which is operated in accordance with the flowcharts shown in FIGS. 4 and 5, and making a CPU (not shown) incorporated in the wireless communications terminal 20 execute the program. In this case, the program may be preinstalled in the wireless communications terminal 20, or downloaded for use in the wireless communications terminal 20 by using the wireless communications function.

FIGS. 6A to 6C are illustrations showing exemplary structures of the control data 31 that is transmitted from the terminal control device 10 to the wireless communications terminal 20. The control data 31a shown in FIG. 6A is used in the case of desiring to restrict the function of students' wireless communications terminals (e.g., mobile phones) within the function state change area (in this case, a school classroom) during class. As the terminal control device 10 transmitting the control data 31a, a server controlling the function states of a mobile phone is placed, for example, as shown in FIG. 1. Both the server and the wireless communications terminal are capable of short-range wireless communications such as Bluetooth. The server is placed on a wall around a doorway 41 of the classroom for transmitting, only when the students are taking lessons, the control data 31a at regular intervals (for example, once every 0.1 seconds) so as to change a function state(s) of the students' mobile phones, etc.

The control data 31a includes control target information and function state change information. The control target information includes two pieces of non-target information. The two pieces of non-target information indicates that the wireless communications terminals of ALL the users who belong to either a TEACHER or a STAFF group are not to be subjected to a function state change. In other words, two pieces of non-target information indicates that the wireless communications terminal of a user who does not belong to any of the TEACHER and the STAFF groups (e.g., student) is to be subjected to a function state change.

The function state change information includes four pieces of function specification information, and a start time and an end time as time specification information, thereby indicating that the function states of the wireless communications terminal are to be changed in order to turn a speaker OFF, a vibration alert ON, a telephone signal transmission OFF, and an e-mail transmission OFF from 19:00 to 20:30. When the students enter the classroom, their mobile phones receive the control data 31a. The function state values of the students' mobile phones are changed temporarily, from 19:00 to 20:30, into values included in the function specification information of the control data 31a by the function state change process (see FIGS. 4 and 5), thereby turning the students' mobile phones "muted, telephone signal transmission OFF, and e-mail transmission OFF" from 19:00 to 20:30. As such, the function of the students' mobile phones is temporarily, that is, when they are taking lessons, restricted within a predetermined range.

Assume that, for example, a student enters the classroom with his/her mobile phone OFF and turns it ON in the classroom in order to avoid his/her mobile phone being subjected to a function state change. Even in this case, with the server capable of obtaining, based on the process end notification 32 transmitted from the mobile phone that has received the control data 31a, an identifier of the mobile phone whose function state(s) has been changed, a server administrator (e.g., teacher) can detect the student whose mobile phone has not been subjected to a function state change by checking the identifiers which are obtained by the server.

The control data 31b shown in FIG. 6B is used in the case of desiring to turn the volume of a person's (hereinafter assumed to be "Taro") headphone to the maximum within the function state change area (in this case, Taro's room). Here, assume that a control system for a wireless communications terminal using the control data 31b includes a component stereo system as the terminal control device 10 and the headphone as the wireless communications terminal 20. Note that both the component stereo system and the headphone are capable of short-range wireless communications such as Bluetooth. The component stereo system is placed in Taro's room, and transmits the control data 31b at regular intervals to change the function states of Taro's headphone.

The control data 31b includes control target information and the function state change information. The control target information includes a piece of target information. The target information indicates that the wireless communications terminal whose user's name is TARO and group name is HEADPHONE (i.e., Taro's headphone) is subjected to a function state change. The function state change information includes a piece of function specification information indicating that the function states of the wireless communications terminal are to be changed to turn the volume of the speaker to MAX (maximum). Furthermore, the group name HEADPHONE and the user's name TARO are stored in Taro's headphone as owner information. With the control data 31b transmitted under such circumstances from the component stereo system to the headphone, it is possible to automatically turn the volume of the headphone to the maximum when Taro enters his room with his headphone on.

The control data 31c shown in FIG. 6C is used for the wireless communications terminal (here, it is referred to as "PDA-light") that can function as a telephone only when the wireless communications terminals is in the vicinity of a specific server. The PDA-light is assumed to be a device that has a telephone function, but usually sends and receives a text message only in order to provide various services inexpensively. When it is necessary to make a call, a user of the PDA-light moves toward the neighborhood of a nearby server, which is placed in various locations. Both the server and the PDA-light are capable of short-range wireless communications such as Bluetooth, and the server transmits the control data 31c at regular intervals for controlling the function states of the PDA-light.

The control data 31c includes control target information and function state change information. The control target information includes a piece of target information. The target information indicates ALL users' wireless communications terminals belonging to a PDA-light group (i.e., all PDA-lights) are subjected to a function state change. The function state change information includes a piece of function specification information and duration as time specification information. The function specification information and the duration indicate that the function states of the wireless communications terminal are to be changed so that the telephone function turns ON for only 600 seconds. Furthermore, a group name PDA-light is stored as owner information in each PDA-light. Thus,the PDA-light, which usually does not function as a telephone, can be used as a telephone for only 600 seconds if it receives the control data 31c in the vicinity of the server.

As described above, in the control system for a wireless communications terminal according to the present embodiment, the wireless communications terminal stores owner information and function states, and the terminal control device transmits, to the wireless communications terminal, control data including control target information for terminal specification and function state change information indicating a function state(s) of the terminal to be changed. The wireless communications terminal determines whether or not the function state(s) is to be changed based on the stored owner information and the received control target information, and changes the stored function states in accordance with the determination result. Thus, it is possible to change a function state(s) of a specific wireless communications terminal.

Furthermore, the wireless communications terminal transmits a process end notification which indicates whether its function state(s) has been changed or not, the notification including the terminal's own identifier. With the process end notification transmitted from the terminal, the terminal control device can check that the wireless communications terminal has changed its function state(s), thereby enabling the function state(s) to be changed effectively.

While the invention has been described in detail, the foregoing description is in all aspects illustrative and not restrictive. It is understood that numerous other modifications and variations can be devised without departing from the scope of the invention.

What is claimed is:

1. A control system for at least one wireless communications terminal for controlling a function of said at least one wireless communications terminal, said system comprising:

a terminal control device; and said at least one wireless communications terminals;

wherein said terminal control device comprises:

a control data generation section operable to generate control data including control target information to specify a terminal of said at least one wireless communications terminal, and function state change information about a change made in a function state of the terminal of said at least one wireless communications terminal; and a transmitting section operable to transmit the control data generated by said control data generation section to said at least one wireless communications terminal;

wherein each of said at least one wireless communications terminal comprises:

an owner information storing section operable to store owner information of said at least one wireless communications terminal;

a function state storing section operable to store the function state of said at least one wireless communications terminal;

a receiving section operable to receive the control data transmitted from said terminal control device;

an extraction section operable to extract the control target information and the function state change information from the control data received by said receiving section;

a determination section operable to determine, based on the control target information extracted by said extraction section, whether or not the function state stored in said function state storing section is to be changed; and a change section operable to change, in accordance with a determination result obtained by said determination section, the function state stored in said function state storing section, based on the function state change information extracted by said extraction section;

wherein the control target information is one of target information for specifying a terminal to be controlled and non-target information for specifying a terminal not to be controlled; and wherein, based on the owner information stored in said owner information storing section, said determination section is operable to determine that the function state stored in said function state storing section is to be changed when said at least one communications terminal is one of specified in the target information and not specified in the non-target information.

2. The control system according to claim 1, wherein;

each of said at least one wireless communications terminal further comprises a response transmitting section operable to transmit, to said terminal control device, a response which indicates whether or not the function state stored in said function state storing section has been changed, the response including identification information of said at least one wireless communications terminal; and said terminal control device further comprises:

a response receiving section operable to receive the response transmitted from said at least one wireless communications terminal;

process history storing section operable to store the response received by said response receiving section as a process history; and a management section operable to change, based on the process history stored in said process history storing section, a content of the control data to be generated by said control data generation section.

3. The control system according to claim 1, wherein:

the function state change information includes function specification information including a value to be set in the terminal of said at least one wireless communications terminal to be controlled, and time specification information specifying a period of time during which the value included in the function specification information of the terminal is effective; and said change section is operable to change, only within the period of time specified by the time specification information, the function state stored in said function state storing section into the value included in the function specification information.

4. A wireless communications terminal structured so that a function thereof is controllable by a terminal control device, said wireless communications terminal comprising:

an owner information storing section operable to store owner information of said wireless communications terminal;

a function state storing section operable to store a function state of said wireless communications terminal;

a receiving section operable to receive, from the terminal control device, control data including control target information to specify a terminal and function state change information indicating a change made in the function state;

an extraction section operable to extract the control target information and the function state change information from the control data received by said receiving section;

a determination section operable to determine, based on the control target information extracted by said extraction section, whether or not the function state stored in said function state storing section is to be changed; and a change section operable to change, in accordance with the determination result obtained by said determination section, the function state stored in said function state storing section, based on the function state change information extracted by said extraction section;

wherein the control target information is one of target information for specifying a terminal to be controlled and non-target information for specifying a terminal not to be controlled; and wherein based on the owner information stored in said owner information storing section, said determination section is operable to determine that the function state stored in said function state storing section is to be changed when said wireless communications terminal is one of specified in the target information and not specified in the non-target information.

5. A control method for at least one wireless communications terminal controlling a function of the at least one wireless communications terminal by using a terminal control device, said method being executed with owner information and a function state of each of the at least one wireless communications terminal being respectively stored in each of the at least one wireless communications terminal, wherein, in the terminal control device, said method comprises:

generating control data including control target information to specify a terminal of the at least one wireless communications terminal and function state change information indicating a change made in the function state of the terminal of the at least one wireless communications terminal; and transmitting the generated control data to the at least one wireless communications terminal;

wherein, in each of the at least one wireless communications terminal, said method comprises:

receiving the transmitted control data; extracting the control target information and the function state change information from the received control data;

determining whether or not the stored function state is to be changed based on the extracted control target information; and changing the stored function state based on the extracted function state change information in accordance with the determination result of said determining;

wherein the control target information is one of target information for specifying a terminal to be controlled and non-target information for specifying a terminal not to be controlled; and wherein, based on the owner information stored in the at least one wireless communications terminal, said determining determines that the function state stored in the at least one wireless communications terminal is to be changed when the at least one wireless communications terminal is one of specified in the target information and not specified in the non-target information.

6. A program executed by at least one a wireless communications terminal for enabling control of a function by using a terminal control device, the program being executed with owner information and a function state of each of the at least one wireless communications terminal being respectively stored in each of the at least one wireless communications terminal, said program comprising:

receiving control data including control target information to specify a terminal and function state change information indicating a change made in the function state of the terminal;

extracting the control target information and the function state change information from the received control data; determining, based on the extracted control target information, whether or not the stored function state is to be changed or not; and changing, in accordance with the determination result of said determining, the stored function state based on the extracted function state change information, wherein the control target information is one of target information for specifying a terminal to be controlled and non-target information for specifying a terminal not to be controlled; and wherein, based on the owner information stored in the at least one wireless communications terminal, said determining determines that the function state stored in the at least one wireless communications terminal is to be changed when the at least one wireless communications terminal is one of specified in the target information and not specified in the non-target information.

* * * * *

UNITED STATES PATENT AND TRADEMARK OFFICE
CERTIFICATE OF CORRECTION

PATENT NO. : 6,961,579 B2
DATED : November 1, 2005
INVENTOR(S) : Hisamori Inukai et al.

It is certified that error appears in the above-identified patent and that said Letters Patent is hereby corrected as shown below:

Column 16,
Line 10, replace ";" with -- : -- after "wherein".

Column 18,
Line 26, make a new paragraph after "data;" and before "determining".

Signed and Sealed this

Twenty-eighth Day of February, 2006

JON W. DUDAS
*Director of the United States Patent and Trademark Office*